United States Patent
Schmidt et al.

(10) Patent No.: US 12,460,040 B2
(45) Date of Patent: Nov. 4, 2025

(54) ISOCYANATE-BASED POLYMER FOAM HAVING IMPROVED FLAME RETARDANT PROPERTIES

(71) Applicant: PROPRIETECT L.P., Toronto (CA)

(72) Inventors: Herbert Schmidt, Richmond Hill (CA); George Ng, Markham (CA); Le Tang, Richmond Hill (CA); Petar Pepic, Toronto (CA); Dorota Ulman, Mississauga (CA)

(73) Assignee: PROPRIETECT L.P., Toronto (CA)

(*) Notice: Subject to any disclaimer, the term of this patent is extended or adjusted under 35 U.S.C. 154(b) by 0 days.

(21) Appl. No.: 14/647,312

(22) PCT Filed: Nov. 26, 2013

(86) PCT No.: PCT/CA2013/000980
§ 371 (c)(1),
(2) Date: May 26, 2015

(87) PCT Pub. No.: WO2014/078943
PCT Pub. Date: May 30, 2014

(65) Prior Publication Data
US 2015/0322194 A1 Nov. 12, 2015

Related U.S. Application Data

(60) Provisional application No. 61/796,956, filed on Nov. 26, 2012.

(51) Int. Cl.
| | | |
|---|---|---|
| *C08G 18/06* | (2006.01) | |
| *C08J 9/00* | (2006.01) | |
| *C08J 9/38* | (2006.01) | |
| *C08K 3/02* | (2006.01) | |
| *C08K 3/04* | (2006.01) | |
| *C09K 21/04* | (2006.01) | |
| *C08G 101/00* | (2006.01) | |

(52) U.S. Cl.
CPC ............ *C08G 18/06* (2013.01); *C08J 9/0066* (2013.01); *C08J 9/38* (2013.01); *C08K 3/02* (2013.01); *C08K 3/04* (2013.01); *C09K 21/04* (2013.01); *C08G 2101/00* (2013.01); *C08J 2201/022* (2013.01); *C08J 2205/05* (2013.01); *C08J 2205/06* (2013.01); *C08J 2205/08* (2013.01); *C08J 2375/02* (2013.01); *C08J 2375/04* (2013.01); *C08K 2003/026* (2013.01)

(58) Field of Classification Search
CPC .............................. C08G 18/038; C09K 21/04
See application file for complete search history.

(56) References Cited

U.S. PATENT DOCUMENTS

| | | | |
|---|---|---|---|
| 5,169,876 A | 12/1992 | Heitmann et al. | |
| 5,464,562 A * | 11/1995 | Patterson | C08J 9/141 252/182.28 |
| 5,760,099 A * | 6/1998 | Horn | C08J 9/0061 521/107 |
| 6,107,355 A * | 8/2000 | Horn | C08G 18/242 521/137 |
| 6,245,826 B1 * | 6/2001 | Wilson | C08L 75/06 521/173 |
| 6,268,402 B1 * | 7/2001 | Wilson | C08G 18/4211 521/173 |
| 6,765,034 B2 | 7/2004 | Nishida et al. | |
| 6,765,035 B2 | 7/2004 | Eling et al. | |
| 2003/0130365 A1 | 7/2003 | Eling et al. | |
| 2007/0129452 A1* | 6/2007 | Clatty | C08L 75/04 521/99 |
| 2010/0087560 A1* | 4/2010 | Crain | C08G 18/163 521/155 |
| 2011/0229673 A1* | 9/2011 | Kurachi | C08L 67/02 428/36.92 |
| 2012/0123004 A1* | 5/2012 | Stowell | C08G 18/48 521/107 |
| 2014/0117271 A1* | 5/2014 | Plaver | C08J 9/0066 252/62 |

FOREIGN PATENT DOCUMENTS

| | | |
|---|---|---|
| JP | H10-147623 A | 6/1998 |
| JP | 2012-97169 A | 5/2012 |
| JP | 5570019 B2 | 8/2014 |
| WO | 2012/067841 A2 | 5/2012 |
| WO | 2013/070370 A1 | 5/2013 |

OTHER PUBLICATIONS

Modesti. M. and Lorenzetti. A., "Halogen-free flame retardants for polymeric foams", Polymer Degradation and Stability, vol. 78, No. 1. Jan. 1, 2002 (Jan. 1, 2002) pp. 167-173.

(Continued)

*Primary Examiner* — Melissa A Rioja
(74) *Attorney, Agent, or Firm* — Katten Muchin; ROSENMAN LLP.

(57) ABSTRACT

There is described an isocyanate-based polymer foam having a V-0 rating according to Underwriters' Laboratories Standard 94 Flammability Test after aging of separate samples of the foam (i) for 168 hours at 150° C., and (ii) for 600 hours at 120° C. The foam may be in the form of a molded foam or a slabstock foam. The foam may be used in vehicular applications, such as an under hood application.

35 Claims, No Drawings

(56) References Cited

OTHER PUBLICATIONS

Office Action for Canadian Patent Application No. 2,892,834 with a mailing date of Apr. 5, 2016.
Office Action for Canadian Patent Application No. 2,892,834 with a mailing date of Jan. 6, 2017.
Nov. 25, 2016 Patent Search Report for Chinese Patent Application No. 2013800713303.
Nov. 25, 2016 First Office Action for Chinese Patent Application No. 2013800713303.
May 31, 2016 extended European search report for European Patent Application No. 13 85 6686.
First Office Action for Chinese Patent Application No. 201380071330.3 and a summary of the office action in English.
Second Office Action for Chinese Patent Application No. 201380071330.3 and a summary of the office action in English.

* cited by examiner

ISOCYANATE-BASED POLYMER FOAM HAVING IMPROVED FLAME RETARDANT PROPERTIES

CROSS-REFERENCE TO RELATED APPLICATION

This application is a 371 of PCT/CA2013/000980, filed Nov. 26, 2013, which claims the benefit under 35 U.S.C. § 119 (e) of provisional patent application Ser. No. 61/796,956, filed Nov. 26, 2012, the contents of which are hereby incorporated by reference.

BACKGROUND OF THE INVENTION

Field of the Invention

In one of its aspects, the present invention relates to an isocyanate-based polymer foam and to a process for production thereof. More particularly, the present invention relates to an isocyanate-based polymer foam, inter alia, having flammability properties compared to prior art foams. In another of its aspects, the present invention relates to a process for producing such an isocyanate-based polymer foam.

Description of the Prior Art

Isocyanate-based foams, such as polyurethane foams, are known in the art. Generally, those of skill in the art understand isocyanate-based polymers to be polyurethanes, polyureas, polyisocyanurates and mixtures thereof.

It is also known in the art to produce foamed isocyanate-based polymers. Indeed, one of the advantages of isocyanate-based polymers compared to other polymer systems is that polymerization and foaming can occur in situ. This results in the ability to mould the polymer while it is forming and expanding.

One of the conventional ways to produce a polyurethane foam is known as the "one-shot" technique. In this technique, the isocyanate, a suitable polyol, a catalyst, water (which acts as a reactive blowing agent and can optionally be supplemented with one or more physical blowing agents) and other additives are mixed together at once using, for example, impingement mixing (e.g., high pressure). Generally, if one were to produce a polyurea, the polyol would be replaced with a suitable polyamine. A polyisocyanurate may result from cyclotrimerization of the isocyanate component. Urethane modified polyureas or polyisocyanurates are known in the art. In either scenario, the reactants would be intimately mixed very quickly using a suitable mixing technique.

Another technique for producing foamed isocyanate-based polymers is known as the "prepolymer" technique. In this technique, a prepolymer is produced by reacting polyol and isocyanate (in the case of a polyurethane) in an inert atmosphere to form a liquid polymer terminated with reactive groups (e.g., isocyanate moieties or active hydrogen moieties). To produce the foamed polymer, the prepolymer is thoroughly mixed with a lower molecular weight polyol (in the case of producing a polyurethane) or a polyamine (in the case of producing a modified polyurea) in the presence of a curing agent and other additives, as needed.

Conventionally, isocyanate-based polymer foams, particularly polyurethane foams have found widespread application in a variety of automotive applications.

Noise and vibration management is a significant issue for vehicle manufacturers, as cabin noise is a major factor in the comfort experience of automotive passengers. Therefore, noise and vibration abatement measures are routinely incorporated into motor vehicles. These abatement measures often utilize flexible polyurethane foams. However, such foams typically are called upon to perform one or more functional purpose that can not be compromised at the expense of noise and vibration absorption, for example, under the hood applications require a high degree of flame resistance, in some cases an Underwriters' Laboratories Standard 94 (UL 94) V-0 rating.

The prior art teaches a number of approaches to achieve various levels of flame retardancy in an isocyanate-based foam such as a polyurethane foam.

One approach involves the use of fire retardant additives in polyurethane foam and is well known. Methods of imparting flame retardancy that combine calcium carbonate, ammonium hydroxide, or another such inorganic compound, halophosphoric acid compound, melamine, or another such compound with a polyol are also known. However, a large amount of such a compound must be added to impart flame retardancy often resulting in considerable problems in relationship to the properties, moldability, economics and the like.

Methods of making flame retardant flexible polyurethane foam can also include adding a halogenated phosphoric acid ester as a flame retardant to a composition for polyester- or polyether-based polyurethane foam and using a reactive flame retardant that adds a phosphorus or halogen atom to the polyhydroxyl compound or organic polyisocyanate that is a raw material of the polyurethane foam. However, the urethane foam obtained by these methods discolors over time, the foam itself deteriorates, and adequate flame retardancy is not maintained over an extended period of time because the flame retardant volatilizes.

Due to recent environmental and market trends, non-halogenated flame retardant solutions have been pursued.

For example, U.S. Pat. No. 6,765,034 [Nishida et al.] teaches a flame resistant flexible polyurethane composition for use in sound deadening and vibration applications that comprises no flame retardants and relies on the selection of a specific isocyanate mixture and polyol. Furthermore, the flammability of said foams is defined only in regard to FMVSS302 flammability test, which is a less stringent flammability test as compared to the UL 94 test. FMVSS (Federal Motor Vehicle Safety Standard) 302 is a horizontal flame test which relates to a material's tendency to melt (therefore not spreading flame) as opposed to UL 94 vertical flame test which describes a material's ability to resist combustion.

U.S. Pat. No. 6,765,035 [Eling et al.] teaches a process to make a flexible polyurethane foam from a rigid polyurethane foam comprising an organic phosphate flame retardant in combination with expandable graphite. The process to produce the foam is a multi-step process requiring a crushing step and a heating step. Furthermore, the polyurethane foams are evaluated by the less stringent flame spread FMVSS 302 test with no mention of UL 94 combustion resistance performance.

U.S. Pat. No. 5,169,876 [Heitmann et al.] discloses a flexible polyurethane foam comprising very high levels (20 to 50 weight percent) of expandable graphite incorporated into the cell walls which meet UL 94 V-0. However, the process requires a heated split stream polyol addition wherein one stream contains the expandable graphite. The high levels of expandable graphite and complex process steps contribute to an expensive product and may negatively affect the resultant foam properties, such as tensile strength.

JP 1998147623 discloses a flexible polyurethane foam with a complex flame retardant mixture comprising ammonium polyphosphate, red phosphorus and expandable graphite. However, to meet UL 94 V-2 or V-0 requirements, said foams require from 4 to 9 times the amount of ammonium polyphosphate as compared to the amount of red phosphorus. There exists an unmet need for a flame resistant polyurethane foam composition for sound deadening and vibration applications which meets UL 94 V-0 requirements, and method to make said foam, that is cost effective, does not require additional multiple process steps over conventional methods, and does not require complex flame retardant mixtures and/or high levels of flame retardants.

International Publication Number WO 2012/067841 [Plaver et al. (Plaver)] teaches a reactive formulation used to make a flame resistant flexible polyurethane foam which is purportedly particularly suited for use in under the hood vehicle applications which require sound deadening and vibration management and a process to make such a foam. In particular, the flame resistant flexible polyurethane foam is made from a reactive formulation comprising an A side comprising one or more organic isocyanate (i) and a B side comprising one or more isocyanate-reactive component (ii), a flame retardant component (iii) comprising a combination of red phosphorus (iii.a), expandable graphite (iii.b), and optionally sodium citrate (iii.c) wherein the flame retardant component does not contain ammonium polyphosphate, and optionally one or more additives (iv) wherein the resulting foam purportedly achieves a V-0 rating at 0.5 inch according to Underwriters' Laboratories Standard 94 Flammability Test. Of particular note, Plaver teaches the red phosphorus (iii.a) is present in an amount of equal to or less than 10 parts based on the total weight of the B side, preferably equal to or less than 8 parts, and more preferably equal to or less than 6 parts based on the total weight of the B side—indeed, the Examples 1-4 in Plaver, red phosphorus is used in an amount of 1.721-5.348 parts by weight based on the total weight of the B side. Plaver further teaches the expandable graphite (iii.b) is present in an amount of equal to or less than 10 parts based on the total weight of the B side, preferably equal to or less than 8 parts, and more preferably equal to or less than 6 parts based on the total weight of the B side—indeed, the Examples 1-4 in Plaver, expandable graphite is used in an amount of 5.164-5.545 parts by weight based on the total weight of the B side Plaver is focussed on production of a foam, which as a virgin foam (i.e., freshly produced) provides a V-0 rating at 0.5 inch according to Underwriters' Laboratories Standard 94 Flammability Test Plaver. Plaver does not teach or suggest any foam (polyurethane or otherwise) that provides a V-0 rating at 0.25 inch according to Underwriters' Laboratories Standard 94 Flammability Test. More particularly, Plaver does not teach or suggest any foam (polyurethane or otherwise) that provides a V-0 rating at 0.25 inch according to Underwriters' Laboratories Standard 94 Flammability Test after heat aging of the foam.

A polyurethane foam which is used in under the hood vehicle applications should continue to possess good flame retardancy over time. Since the under the hood application is a relatively high temperature environment, it is particularly important that the foam continue to pass the Underwriters' Laboratories Standard 94 Flammability Test after heat aging of the foam. In addition, producing a foam of 0.25 inch (7 mm) or 0.374 in (10 mm) thickness that will pass the Underwriters' Laboratories Standard 94 Flammability Test is more difficult since there less volume and mass of foam compared to a foam of 0.5 inch thickness. This is particularly so when the density of the foam is less than 1.5 pounds per cubic foot (pcf), e.g., 1.3 pcf.

Thus, it would be advantageous to have a foam that obviates or mitigates at least some of the above-mentioned disadvantages of the prior art. More particularly, it would be highly advantageous to have an isocyanate-based foam (e.g., a polyurethane foam) that provides a V-0 rating at 0.25 inch (7 mm) or 0.374 in (10 mm) thickness according to Underwriters' Laboratories Standard 94 Flammability Test after heat aging of the foam. It would be particularly advantageous to have such a foam with a density of less than 1.5 pounds per cubic foot (pcf), e.g., 1.3 pcf. Ideally, such a foam would be produced without significantly compromising any physical property of the foam.

SUMMARY OF THE INVENTION

It is an object of the present invention to obviate or mitigate at least one of the above-mentioned disadvantages of the prior art.

It is another object of the present invention to provide a novel isocyanate-based polymer foam.

Accordingly, in one of its aspects, the present invention provides an isocyanate-based polymer foam produced from a reaction mixture comprising:
(i) at least one isocyanate;
(ii) at least one active hydrogen-containing compound;
(iii) red phosphorus in an amount greater than about 10 parts by weight per 100 parts by weight of component (ii); and
(iv) expandable graphite in an amount greater than about 10 parts by weight per 100 parts by weight of component (ii).

In another of its aspects, the present invention provides an isocyanate-based polymer foam provides a V-0 rating according to Underwriters' Laboratories Standard 94 Flammability Test after aging of separate samples of the foam (i) for 168 hours at 150° C., and (ii) for 600 hours at 120° C.

In yet another of its aspects, the present invention provides an isocyanate-based polymer foam that provides a V-0 rating at 7 mm thickness according to Underwriters' Laboratories Standard 94 Flammability Test after aging of separate samples of the foam (i) for 168 hours at 150° C., and (ii) for 600 hours at 120° C.

In yet another of its aspects, the present invention provides an isocyanate-based polymer foam that provides a V-0 rating at 10 mm thickness according to Underwriters' Laboratories Standard 94 Flammability Test after aging of separate samples of the foam (i) for 168 hours at 150° C., and (ii) for 600 hours at 120° C.

In yet another of its aspects, the present invention provides an isocyanate-based polymer foam that provides a V-0 rating at 13 mm thickness according to Underwriters' Laboratories Standard 94 Flammability Test after aging of separate samples of the foam (i) for 168 hours at 150° C., and (ii) for 600 hours at 120° C.

In yet another of its aspects, the present invention provides use of a combination of red phosphorus and expandable graphite to improve the flame retardant properties of an isocyanate-based polymer that has been aged for 168 hours at 150° C. and 600 hours at 120° C. compared to a an unaged foam tested pursuant to Underwriters' Laboratories Standard 94 Flammability Test.

In yet another of its aspects, the present invention provides use of a combination of red phosphorus and expandable graphite to provide an isocyanate-based polymer foam that has a V-0 rating according to Underwriters' Laboratories Standard 94 Flammability Test after aging of separate samples of the foam (i) for 168 hours at 150° C., and (ii) for 600 hours at 120° C.

In yet another of its aspects, the present invention provides use of a combination of red phosphorus and expandable graphite to to provide an isocyanate-based polymer foam that has a V-0 rating at 7 mm thickness according to Underwriters' Laboratories Standard 94 Flammability Test after aging of separate samples of the foam (i) for 168 hours at 150° C., and (ii) for 600 hours at 120° C.

In yet another of its aspects, the present invention provides use of a combination of red phosphorus and expandable graphite to provide an isocyanate-based polymer foam that has a V-0 rating at 10 mm thickness according to Underwriters' Laboratories Standard 94 Flammability Test after aging of separate samples of the foam (i) for 168 hours at 150° C., and (ii) for 600 hours at 120° C.

In yet another of its aspects, the present invention provides use of a combination of red phosphorus and expandable graphite to to provide an isocyanate-based polymer foam that has a V-0 rating at 13 mm thickness according to Underwriters' Laboratories Standard 94 Flammability Test after aging of separate samples of the foam (i) for 168 hours at 150° C., and (ii) for 600 hours at 120° C.

Thus, the present inventors have discovered an isocyanate-based polymer foam that his improved flammability properties.

More particularly, the present inventors have discovered that an isocyanate-based polymer foam having improved flammability properties can be produced if a particular amount of expandable graphite and red phosphorus (as described below) are included in the formulation used to make the foam. The improved flammability properties include the ability of the present isocyanate-based polymer foams to provide a V-0 rating according to Underwriters' Laboratories Standard 94 Flammability Test after heat aging of the foam.

As used throughout the specification, when reference is made to "heat aging" of the present isocyanate-based polymer foam, it is intended to mean that separate samples of the foam will pass the Underwriters' Laboratories Standard 94 Flammability Test after the samples are subjected to heat aging for (i) 168 hours at 150° C., and (ii) 600 hours at 120° C., respectively. A particular advantage of the present isocyanate-based polymer foams is that they provide these improved flammability properties at thicknesses of the foam of 7 mm, 10 mm and 13 mm. A further advantage is that these improved flammability properties can be seen when producing a foam having a low density—i.e., less than 1.5 pcf and preferably about 1.3 pcf.

Enhanced flammability properties can be seen in both molded and slab foams produced according to the present invention. This renders the present invention useful in a number of applications, particularly automotive applications such as under hood liners.

In a preferred embodiment, the present isocyanate-based polymer foam additional passes the Underwriters' Laboratories Standard 94 Flammability Test after the foam has been aged for 216 hours at 160° C.

DETAILED DESCRIPTION OF THE PREFERRED EMBODIMENTS

In one of its aspects, the present invention relates to an isocyanate-based polymer foam produced from a reaction mixture comprising: (i) at least one isocyanate; (ii) at least one active hydrogen-containing compound; (iii) red phosphorus in an amount greater than about 10 parts by weight per 100 parts by weight of component (ii); and (iv) expandable graphite in an amount greater than about 10 parts by weight per 100 parts by weight of component (ii).

Preferably, the isocyanate-based polymer is selected from the group comprising polyurethane, polyurea, urea-modified polyurethane, urethane-modified polyurea and isocyanurate-modified polyurethane. As is known in the art, the term "modified", when used in conjunction with a polyurethane or polyurea means that up to 50% of the polymer backbone forming linkages have been substituted.

The selection of an isocyanate suitable for use in the reaction mixture is within the purview of a person skilled in the art. Generally, the isocyanate compound suitable for use may be represented by the general formula:

$$Q(NCO)_i$$

wherein i is an integer of two or more and Q is an organic radical having the valence of i. Q may be a substituted or unsubstituted hydrocarbon group (e.g., an alkylene or arylene group). Moreover, Q may be represented by the general formula:

$$Q^1\text{-}Z\text{-}Q^1$$

wherein $Q^1$ is an alkylene or arylene group and Z is chosen from the group comprising —O—, —O-$Q^1$-, —CO—, -$Q^1$-N=C=N-$Q^1$-, —S—, —S-$Q^1$-S— and —SO$_2$—. Examples of isocyanate compounds which fall within the scope of this definition include hexamethylene diisocyanate, 1,8-diisocyanato-p-methane, xylyl diisocyanate, (OCNCH$_2$CH$_2$CH$_2$OCH$_2$O)$_2$, 1-methyl-2,4-diisocyanato-cyclohexane, phenylene diisocyanates, toluene diisocyanates, chlorophenylene diisocyanates, diphenylmethane-4,4'-diisocyanate, naphthalene-1,5-diisocyanate, triphenylmethane-4,4',4"-triisocyanate and isopropylbenzene-alpha-4-diisocyanate.

In another embodiment, Q may also represent a polyurethane radical having a valence of i. In this case $Q(NCO)_i$ is a compound which is commonly referred to in the art as a prepolymer. Generally, a prepolymer may be prepared by reacting a stoichiometric excess of an isocyanate compound (as defined hereinabove) with an active hydrogen-containing compound (as defined hereinafter), preferably the polyhydroxyl-containing materials or polyols described below. In this embodiment, the polyisocyanate may be, for example, used in proportions of from about 30 percent to about 200 percent stoichiometric excess with respect to the proportion of hydroxyl in the polyol. Since the process of the present invention may relate to the production of polyurea foams, it will be appreciated that in this embodiment, the prepolymer could be used to prepare a polyurethane modified polyurea.

In another embodiment, the isocyanate compound suitable for use in the process of the present invention may be selected from dimers and trimers of isocyanates and diisocyanates, and from polymeric diisocyanates having the general formula:

$$[Q''(NCO)_i]_j$$

wherein both i and j are integers having a value of 2 or more, and Q" is a polyfunctional organic radical, and/or, as additional components in the reaction mixture, compounds having the general formula:

$$L(NCO)_i$$

wherein i is an integer having a value of 1 or more and L is a monofunctional or polyfunctional atom or radical. Examples of isocyanate compounds which fall with the scope of this definition include ethylphosphonic diisocyanate, phenylphosphonic diisocyanate, compounds which contain a =Si—NCO group, isocyanate compounds derived from sulphonamides ($QSO_2NCO$), cyanic acid and thiocyanic acid.

See also for example, British patent number 1,453,258, for a discussion of suitable isocyanates.

Non-limiting examples of suitable isocyanates include: 1,6-hexamethylene diisocyanate, 1,4-butylene diisocyanate, furfurylidene diisocyanate, 2,4-toluene diisocyanate, 2,6-toluene diisocyanate, 2,4'-diphenylmethane diisocyanate, 4,4'-diphenylmethane diisocyanate, 4,4'-diphenylpropane diisocyanate, 4,4'-diphenyl-3,3'-dimethyl methane diisocyanate, 1,5-naphthalene diisocyanate, 1-methyl-2,4-diisocyanate-5-chlorobenzene, 2,4-diisocyanato-s-triazine, 1-methyl-2,4-diisocyanato cyclohexane, p-phenylene diisocyanate, m-phenylene diisocyanate, 1,4-naphthalene diisocyanate, dianisidine diisocyanate, bitoluene diisocyanate, 1,4-xylylene diisocyanate, 1,3-xylylene diisocyanate, bis-(4-isocyanatophenyl)methane, bis-(3-methyl-4-isocyanatophenyl)methane, polymethylene polyphenyl polyisocyanates and mixtures thereof.

A particularly preferred class of isocyanates useful in the present isocyanate-based polymer foam is the so-called aromatic-based isocyanates (e.g., those isocyanates based on diphenylmethane diisocyanate and/or toluene diisocyanate). When the present isocyanate-based polymer foam is produced as a slab foam, it is preferred to use polymeric diphenylmethane diisocyanate and/or toluene diisocyanate.

A more preferred isocyanate is a mixture comprising (i) a prepolymer of 4,4'-diphenylmethane diisocyanate and (ii) a carbodiimide-derivative based on 4,4'-diphenylmethane diisocyanate. Preferably the mixture comprises a weight ratio of (i):(ii) in the range of from about 1:1 to about 9:1.

Another more preferred isocyanate is selected from the group comprising 2,4-toluene diisocyanate, 2,6-toluene diisocyanate and mixtures thereof, for example, a mixture comprising from about 75 to about 85 percent by weight 2,4-toluene diisocyanate and from about 15 to about 25 percent by weight 2,6-toluene diisocyanate.

The most preferred isocyanate is selected from the group comprising 2,4'-diphenylmethane diisocyanate, 4,4'-diphenylmethane diisocyanate, modified 4,4'-diphenylmethane diisocyanate (modified to liquefy the diisocyanate at ambient temperature) and mixtures thereof.

Preferably, the isocyanate used in the present process has a functionality in the range of from about 2.0 to about 2.8. When the present isocyanate-based polymer foam is produced as a slab foam, it is preferred that functionality is 2.7-2.8 when MDI is used and 2.0 when TDI is used.

The isocyanate preferably is used in an amount to provide an isocyanate index, inclusive of all reactive equivalents in the reaction mixture, in the range of from about 60 to about 120, more preferably from about 70 to about 115, most preferably from about 85 to about 115. When the present isocyanate-based polymer foam is produced as a slab foam, it is preferred that the isocyanate index is below about 80.

If the process is utilized to produce a polyurethane foam, the active hydrogen-containing compound is typically a polyol.

The choice of polyol suitable for use herein is within the purview of a person skilled in the art. For example, the polyol may be a hydroxyl-terminated backbone of a member selected from the group comprising polyether, polyester, polycarbonate, polydiene and polycaprolactone. Preferably, the polyol is selected from the group comprising hydroxyl-terminated polyhydrocarbons, hydroxyl-terminated polyformals, fatty acid triglycerides, hydroxyl-terminated polyesters, hydroxymethyl-terminated polyesters, hydroxymethyl-terminated perfluoromethylenes, polyalkyleneether glycols, polyalkylenearyleneether glycols and polyalkyleneether triols. More preferred polyols are selected from the group comprising adipic acid-ethylene glycol polyester, poly(butylene glycol), poly(propylene glycol) and hydroxyl-terminated polybutadiene—see, for example, British patent number 1,482,213, for a discussion of suitable polyols.

A preferred polyol comprises polyether polyols. Preferably, such a polyether polyol has a molecular weight in the range of from about 200 to about 10,000, more preferably from about 2,000 to about 8,000, most preferably from about 4,000 to about 7,000.

When the present isocyanate-based polymer foam is produced as a slab foam, it is preferred that use is made of a polyether polyol Preferably, such a polyether polyol has a molecular weight in the range of from about 1,500 to about 3,000.

Further, it is possible to utilize a prepolymer technique to produce a polyurethane foam within the scope of the present invention. In one embodiment, it is contemplated that the prepolymer be prepared by reacting an excess of isocyanate with a polyol (as discussed above). The prepolymer could then be reacted with further polyol (the same or different than the first polyol) to produce a polyurethane foam or an amine to produce a polyurea-modified polyurethane.

If the process is utilized to produce a polyurea foam, the active hydrogen-containing compound comprises compounds wherein hydrogen is bonded to nitrogen. Preferably such compounds are selected from the group comprising polyamines, polyamides, polyimines and polyolamines, more preferably polyamines. Non-limiting examples of such compounds include primary and secondary amine terminated polyethers. Preferably such polyethers have a molecular weight of greater than about 230 and a functionality of from 2 to 6. Such amine terminated polyethers are typically made from an appropriate initiator to which a lower alkylene oxide is added with the resulting hydroxyl terminated polyol being subsequently aminated. If two or more alkylene oxides are used, they may be present either as random mixtures or as blocks of one or the other polyether. For ease of amination, it is especially preferred that the hydroxyl groups of the polyol be essentially all secondary hydroxyl groups. Typically, the amination step replaces the majority but not all of the hydroxyl groups of the polyol.

In another embodiment, active hydrogen-containing polymer may comprise a polymer polyol, also known as graft copolymer polyols. As is known in the art, such polyols are generally polyether polyol dispersions which are filled with other organic polymers. Such polymer polyols are useful in load building or improving the hardness of the foam when compared to using unmodified polyols. Non-limiting examples of useful polymer polyols include: chain-growth copolymer polyols (e.g., containing particulate poly(acrylonitrile), poly(styrene-acrylonitrile) and mixtures thereof), and/or step-growth copolymer polyols (e.g., PolyHarnstoff Dispersions (PHD), polyisocyanate polyaddition (PIPA) polyols, epoxy dispersion polyols and mixtures thereof). For further information on polymer polyols, see, for example, Chapter 2 of FLEXIBLE FOAM FUNDAMENTALS, Herrington et al. (1991) and the references cited therein. If a polymer polyol is used, it is preferred to admix the polymer polyol with a base polyol. Generally, mixtures may be used which contain polymer polyol in an amount in the range of from about 5 to about 50 percent by weight of unmodified polyol present in the mixture.

The active hydrogen-containing polymer may also be a so-called bio-based polyol. As used throughout this specification, the term "bio-based polyols" is a generic term intended to encompass polyols derived from renewable resources such as a vegetable oil or another bio-originated material.

The preferred bio-based polyol is a vegetable oil-based polyol. Non-limiting examples of suitable vegetable oils from which such a polyols may be derived include soybean oil, safflower oil, linseed oil, corn oil, sunflower oil, olive oil, canola oil, sesame oil, cottonseed oil, palm oil, rapeseed oil, tung oil, fish oil, peanut oil and combinations thereof. Also useful are partially hydrogenated vegetable oils and genetically modified vegetable oils, including high oleic safflower oil, high oleic soybean oil, high oleic peanut oil, high oleic sunflower oil and high erucic rapeseed oil (crambe oil).

A suitable method to prepare the bio-based (e.g., vegetable oil-based) polyol involves reacting the vegetable oil (or mixture of vegetable oils) with a peroxyacid, providing an epoxidized vegetable oil. Essentially, some or all of the double bonds of the vegetable oil may be epoxidized. The epoxidized vegetable oil may be further reacted with an alcohol, a catalytic amount of fluoroboric acid and, optionally, water to form the polyol. Such polyols contain all secondary hydroxyl groups.

These bio-based polyols may be used directly in a reaction mixture to produce an isocyanate-based foam such as a polyurethane foam. Alternatively, the bio-based polyols may be reacted with the epoxidized vegetable oils described above in the presence of a fluoroboric acid catalyst and, optionally, water to form a bio-based polyol suitable for use in a reaction mixture to produce an isocyanate-based foam such as a polyurethane foam.

Examples of such preparations are described, for example, in one or more of

U.S. Pat. No. 6,686,435 [Petrovic et al.];
U.S. Pat. No. 6,107,433 [Petrovic et al.];
U.S. Pat. No. 6,573,354 [Petrovic et al.]; and
U.S. Pat. No. 6,433,121 [Petrovic et al.].

Alternatively, the epoxidation reaction may be conducted under conditions that result in a polyol having residual double bonds.

Also suitable are modified vegetable-oil based polyols prepared by a hydroformylation process. In this process, a vegetable oil is reacted with carbon monoxide and hydrogen in the presence of a Group VIII metal catalyst (e.g., a rhodium catalyst) to form a hydroformylated vegetable oil. The hydroformylated vegetable oil is then hydrogenated to form the modified vegetable oil-based polyol. This process produces polyols containing all primary hydroxyl groups. These polyols may be used directly in a reaction mixture to produce an isocyanate-based foam such as a polyurethane foam. Alternatively, they may be reacted with the epoxidized vegetable oils described above in the presence of a fluoroboric acid catalyst and, optionally, water to form a polyol suitable for use in a reaction mixture to produce an isocyanate-based foam such as a polyurethane foam.

A preferred bio-based polyol is described in International Publication Number WO 2008/106769 [Stanciu et al.].

The above-mentioned reaction mixture further comprises red phosphorus in an amount greater than about 10 parts by weight per 100 parts by weight of component (ii) (i.e., the total amount of active hydrogen-containing compound(s)). Preferably, red phosphorus is used in an amount greater than about 12 parts by weight, more preferably in the range of from about 12 to about 30 parts by weight, even more preferably from about 12 to about 25 parts by weight, even more preferably from about 12 to about 22 parts by weight per 100 parts by weight of component (ii) (i.e., the total amount of active hydrogen-containing compound(s)). When the present isocyanate-based polymer foam is produced as a molded foam, it is preferred even more preferably from about 14 to about 16 parts by weight, most preferably about 15 by weight, per 100 parts by weight of component (ii) (i.e., the total amount of active hydrogen-containing compound(s)). When the present isocyanate-based polymer foam is produced as a slab foam, it is preferred even more preferably from about 18 to about 22 parts by weight, most preferably about 20 by weight, per 100 parts by weight of component (ii) (i.e., the total amount of active hydrogen-containing compound(s)).

The red phosphorus used in the above-mentioned reaction mixture is inorganic. The inorganic red phosphorus may be untreated or may have been surface treated by an inorganic substance and/or organic substance (referred to hereinafter as coated red phosphorus), and the like. It is especially preferable to use coated red phosphorus in terms of the stability and ease of handling. Non-limiting examples of commercially available useful red phosphorus products include NOVA RED™ and NOVA EXCEL™ available from Rin Kagaku Kogyo Co., HISHIGUARD™ available from Nippon Chemical Industries Co., and EXOLIT™ RP6520 available from Clariant. The red phosphorous can be neat, as a concentrate or used as a mixture, solution, or a thixotropic dispersion in a carrier medium such as castor oil, diphenyloctylphosphate, tris(chloropropyl)phosphate (TCPP), etc., for example EXOLIT™ RP6590 (TP) and EXOLIT™ RP 6580 available from Clariant.

The above-mentioned reaction mixture further comprises expandable graphite in an amount greater than about 10 parts by weight per 100 parts by weight of component (ii) (i.e., the total amount of active hydrogen-containing compound(s)). Preferably, expandable graphite is used in an amount greater than about 12 parts by weight, more preferably in the range of from about 12 to about 40 parts by weight, even more preferably from about 15 to about 30 parts by weight, even more preferably from about 15 to about 25 parts by weight, even more preferably from about 17 to about 23 parts by weight, most preferably about 20 by weight, per 100 parts by weight of component (ii) (i.e., the total amount of active hydrogen-containing compound(s)).

Expandable graphite is well known in the art. Non-limiting examples of expandable graphite include crystalline compounds that maintain the laminar structure of the carbon that has grown a graphite interlayer compound by treating natural flaky graphite, pyrolytic graphite, Kish graphite or another such powder by concentrated sulfuric acid, nitric acid or another such inorganic acid and concentrated nitric acid, perchloric acid, permanganic acid, bichromate, or another such strong oxidizing agent. Expandable graphite that has been neutralized by ammonia, an aliphatic lower amine, alkali metal compound, alkaline earth metal compound or the like is preferably used. Non-limiting examples of aliphatic lower amines include monomethyl amine, dimethyl amine, trimethyl amine, ethyl amine and the like. Examples of alkali metal compounds and alkaline earth metal compounds include hydroxides, oxides, carbonates, sulfates, organic acid salts and the like of potassium, sodium, calcium, barium, magnesium and the like. Preferably expandable graphite flakes have a size of from 0.3 to 1.0 mm.

In one embodiment, the expandable graphite used in the above-mentioned reaction mixture is formed of graphite, with $H_2SO_4$ or $SO_4^{2-}$, for example, having two free negative valences, which attach to two free positive valences of a hydrocarbon ring, incorporated between the planes of the graphite mesh. When the isocyanate-based polymer foam (e.g., flexible polyurethane foam) is burned, this graphite expands to from 100 to 200 times its volume, giving off $SO_3$ and/or $SO_2$ and water. A loose, expanded mass that acts in an insulating manner thus forms.

Non-limiting examples of commercially available useful expandable graphite products include NYAGRAPH™ available from Naycol Nano Technologies, Inc., CA-60S™ available from Nippon Kasei Chemical Co. and CALLOTEK™ available from Graphitwerk Kropfmuehlm AG.

The above mentioned reaction mixture may comprise one or more types of other additional materials as may be useful in the particular manufacturing process that is used or to impart desired characteristics to the resulting foam. Non-limiting examples of these other additional materials include, for example, catalysts, blowing agents, cell openers, surfactants, crosslinkers, chain extenders, flame retardants (other than red phosphorus, expandable ammonium polyphosphate, and sodium citrate), fillers, colorants, pigments, antistatic agents, reinforcing fibers, antioxidants, preservatives, acid scavengers, and any mixtures thereof.

For example, in order to prepare a polyurethane foam of the present invention a blowing agent is required, preferably water. However if the amount of water is not sufficient to obtain the desired density of the foam any other known way to prepare polyurethane foams may be employed additionally, like the use of reduced or variable pressure, the use of a gas like air, $N_2$ and $CO_2$, the use of more conventional blowing agents like chlorofluorocarbons, hydrofluorocarbons, hydrocarbons and fluorocarbons, the use of other reactive blowing agents—i.e., agents which react with any of the ingredients in the reacting mixture and due to this reaction liberate a gas which causes the mixture to foam and the use of catalysts which enhance a reaction which leads to gas formation like the use of carbodiimide-formation-enhancing catalysts such as phospholene oxides. Combinations of these ways to make foams may be used as well. The amount of blowing agent may vary widely and primarily depends on the desired density. Water may be used as liquid at below-ambient, ambient or elevated temperature and as steam.

In one embodiment of the present invention, a combination of blowing agents is used—e.g., water and $CO_2$ wherein the $CO_2$ is added to the ingredients for making the foam in the mixing head of a device for making the foam, to one of the active hydrogen-containing compounds and preferably to the polyisocyanate before the polyisocyanate is brought into contact with the isocyanate containing compounds.

In one embodiment, the isocyanate-based polymer form of the present invention is in the form of a polyurethane foam and is made from the above-mentioned reaction mixture comprising components (i), (ii), (iii) and (iv) in the presence of water. Preferably, such formulations contain from 1 to 10 parts by weight, per 100 parts by weight of the component (ii)—i.e., the active hydrogen-containing compound(s). The amount of water used will preferably be closer to the lower end of this range for the production of molded polyurethane foam and closer to the upper end of this range for the production of slab polyurethane foam.

Desirable polyurethane foam can be made in a slabstock process or in a closed mold. Closed mold molding processes are preferred to make shaped products such as under the hood applications, for example, engine encapsulation members—these are typically in the form of flexible foam. Slab or slabstock polyurethane foams are typically semi-rigid in nature and are cut into sheets, then each sheet is formed in a mold or die to a desired shape, typically with a fabric layer on opposed major surfaces of the foam.

As an additional component to the reaction mixture, one or more catalyst may be present in the B side of the reactive formulation of the present invention. One preferred type of catalyst is a tertiary amine catalyst. The tertiary amine catalyst may be any compound possessing catalytic activity for the reaction between a polyol and an organic polyisocyanate and at least one tertiary amine group. Representative tertiary amine catalysts include trimethylamine, triethylamine, dimethylethanolamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether, bis(2-dimethylaminoethyl) ether, morpholine, 4,4'-(oxydi-2,1-ethanediyl)bistriethylenediamine, pentamethyl diethylene triamine, dimethyl cyclohexyl amine, N-acetyl-N,N-dimethyl amine, N-cocomorpholine, N,N-dimethyl aminomethyl N-methyl ethanol amine, N,N,N'-trimethyl-N'-hydroxyethyl bis(aminoethyl)ether, N,N-bis(3-dimethylaminopropyl)N-isopropanolamine, (N,N-dimethyl)amino-ethoxy ethanol, N,N,N',N'-tetramethyl hexane diamine, 1,8-diazabicyclo-5,4,0-undecene-7-N,N-dimorpholinodiethy]ether, N-methyl imidazole, dimethyl aminopropyl dipropanolamine, bis(dimethylaminopropyl)amino-2-propanol, tetramethylamino bis(propylamine), (dimethyl(aminoethoxyethyl))((dimethyl amine)ethyl)ether, tris(dimethylamino propyl)amine, dicyclohexyl methyl amine, bis(N,N-dimethyl-3-aminopropyl)amine, 1,2-ethylene piperidine, methyl-hydroxyethyl piperazine and any mixture of two or more of these.

The above-mentioned reaction mixture may comprise one or more other catalysts, in addition to or instead of the tertiary amine catalyst mentioned before. Of particular interest among these are tin carboxylates and tetravalent tin compounds. Examples of these include stannous octoate, dibutyl tin diacetate, dibutyl tin dilaurate, dibutyl tin dimercaptide, dialkyl tin dialkylmercapto acids, dibutyl tin oxide, dimethyl tin dimercaptide, dimethyl tin diisooctylmercaptoacetate, and the like.

Catalysts are typically used in small amounts. For example, the total amount of catalyst used may be in the range of from about 0.0015 to about parts by weight, preferably from about 0.01 to about 1 parts by weight, per 100 parts by weight of active hydrogen-containing compound(s)—i.e., component (ii). Organometallic catalysts are typically used in amounts towards the low end of these ranges.

The above mentioned reaction mixture may further comprise as an additional component a crosslinker, which preferably is used, if at all, in small amounts, preferably up about 2 parts by weight, more preferably up to 0.75 parts by weight, even more preferably up to 0.5 parts by weight, per 100 parts by weight of active hydrogen-containing compound(s)—i.e., component (ii). The crosslinker typically contains at least three isocyanate-reactive groups per molecule and has an equivalent weight, per isocyanate-reactive group, of from 30 to about 125 and preferably from 30 to 75. Aminoalcohols such as monoethanolamine, diethanolamine and triethanolamine are preferred types to be used for molded polyurethane foam, although compounds such as glycerine, short polyols based on trimethylolpropane and pentaerythritol as starters also can be used. For slab (semi-rigid) foam, different crosslinkers are used—e.g., the may be based on sucrose and/or sorbitol and typically have a functionality of greater than 4.

The above mentioned reaction mixture may further comprise as an additional component a surfactant. A surfactant is preferably included in the foam formulation to help stabilize the foam as it expands and cures. Non-limiting examples of surfactants include nonionic surfactants and wetting agents such as those prepared by the sequential addition of propylene oxide and then ethylene oxide to propylene glycol, solid or liquid organosilicones, and polyethylene glycol ethers of long chain alcohols. Ionic surfactants such as tertiary amine or alkanolamine salts of long chain alkyl acid sulfate esters, alkyl sulfonic esters and alkyl arylsulfonic acids can also be used. The surfactants prepared by the sequential addition of propylene oxide and then ethylene oxide to propylene glycol are preferred, as are the solid or liquid organosilicones. Examples of useful organosilicone surfactants include commercially available polysiloxane/polyether copolymers such as TEGOSTAB™ B-8729, and B-8719LF available from Goldschmidt Chemical Corp., and NIAX™ L2171 surfactant from Momentive Performance Materials. Non-hydrolyzable liquid organosilicones are more preferred. When a surfactant is used, it is typically present in an amount of from about 0.0015 to 1 parts by weight, per 100 parts by weight of active hydrogen-containing compound(s)—i.e., component (ii).

A cell opener may be present as an additional component in the above-mentioned reaction mixture. The cell opener functions during the polymerization reaction to break cell walls and therefore promote the formation of an open cell structure. A high open cell content (at least 25 percent by number, preferably at least 50 percent) is usually beneficial for foams that are used in noise and vibration absorption applications. A useful type of cell opener includes ethylene oxide homopolymers or random copolymers of ethylene oxide and a minor proportion of propylene oxide, which have a molecular weight of 5000 or more. These cell openers preferably have a hydroxyl functionality of at least 4, more preferably at least 6. Cell openers are preferably used in amounts from about 0.5 to about 5 parts by weight per 100 parts by weight of active hydrogen-containing compound(s)—i.e., component (ii).

A chain extender may be employed as an additional component in the above-mentioned reaction mixture. A chain extender is a compound having two isocyanate-reactive groups and an equivalent weight per isocyanate-reactive group of up to 499, preferably up to 250. Chain extenders, if present at all, are usually used in small amounts, such as up to about 10, preferably up to about 5, more preferably up to 2 parts by weight per 100 parts by weight of active hydrogen-containing compound(s)—i.e., component (ii). Non-limiting examples of suitable chain extenders include ethylene glycol, diethylene glycol, methylene glycol, propylene glycol, dipropylene glycol, tripropylene glycol, 1,4-dimethylolcyclohexane, 1,4-butane diol, 1,6-hexane diol, 1,3-propane diol, diethyltoluene diamine, amine-terminated polyethers such as JEFFAMINE™ D-400 from Huntsman Chemical Company, amino ethyl piperazine, 2-methyl piperazine, 1,5-diamino-3-methyl-pentane, isophorone diamine, ethylene diamine, hexane diamine, hydrazine, piperazine, mixtures thereof and the like.

The above-mentioned reaction mixture may also comprise as an additional component a filler, which reduces overall cost, load bearing and other physical properties to the product. The filler may constitute up to about 50 percent of the total weight of the reaction mixture (i.e., the combined weight of components (i), (ii), (iii) and (iv) described above). Non-limiting examples of suitable fillers may be selected from the group consisting of include talc, mica, montmorillonite, marble, barium sulfate (barytes), milled glass granite, milled glass, calcium carbonate, aluminum trihydrate, carbon, aramid, silica, silica-alumina, zirconia, talc, bentonite, antimony trioxide, kaolin, coal based fly ash, boron nitride and any mixture of two or more of these.

The isocyanate-based polymer foam according to the invention can be made in a slabstock process or in a closed mold molding process. Slabstock foam is formed as a large bun which is cut into the required shape and size for use. Closed mold molding processes can be either so-called hot molding process or a cold molding process wherein the foaming takes place in a closed mold. After the foam has cured, the mold is opened, the flexible foam is removed and crushed in a conventional manner to open the cellular structure. An integral skin can be formed onto the surface of the foam in the mold. A film, fabric, leather or other coverstock can be inserted into the mold prior to introducing the reactive formulation, to produce a foam that has a desirable show surface.

Polyurethane foam formulations in accordance with the invention that contain a mixture of ethylene oxide-capped polypropylene oxides have been found to process well in the production of molded foams, especially in formulations in which water is used as a blowing agent, especially when used as the sole blowing agent as described herein above. Polyurethane foam formulations in accordance with the invention that contain a one or more propylene oxide-capped polyols have been found to process well in the production of slab foams, especially in formulations in which water is used as a blowing agent, especially when used as the sole blowing agent as described herein above. Good processing herein refers to the ability of a foam formulation to consistently produce good quality foam in an industrial setting. Good processing is indicated by consistently uniform cell structure, complete mold filling, consistently good surface appearance, consistent foam density and consistency in foam physical properties as the foam is produced over time. The foam formulation tolerates small changes in operating temperatures, catalyst levels and other process conditions which often cause significant product inconsistencies in other high water foam formulations.

As stated above, it is often preferred to crush the molded foam in accordance with the invention to open the cells. A high open cell content (at least 25 percent by number, preferably at least 50 percent) is usually beneficial for foams that are used in noise and vibration absorption applications. As is known in the art, slab foams do not need to be crushed and thus, this step is normally omitted when a slab foam according to the invention is produced.

Flexible polyurethane foam is characterized in having a resiliency, as determined using the ASTM D-3574 ball rebound test, which measures the height a ball rebounds from the surface of the foam when dropped under specified conditions. Under the ASTM test, the foam exhibits a resiliency of at least 40 percent, especially at least 50 percent. The flexible polyurethane foam of the present invention advantageously also has a density in the range of 4 to 10 pounds/cubic foot (pcf) (64-160 kg/m$^3$), preferably from 5 to 8.8 pounds/cubic foot (80-140 kg/m³). Density is conveniently measured according to ASTM D-3574.

The slab or slabstock polyurethane foam of the present invention advantageously has a density in the range of from about 1 to about 4 pounds/cubic foot (pcf) (16-64 kg/m³), preferably from about 1 to about 2.5 pounds/cubic foot (16-40 kg/m³), most preferably about 1.3 pounds/cubic foot (20.8 kg/m³. Density is conveniently measured according to ASTM D-3574.

In one embodiment, the present isocyanate-based polymer foam is a flexible polyurethane foam and more preferably has a tensile strength in the range of from about 150 to about 800 kPa. Preferably, the tensile strength of the foam according to the present invention is equal to or greater than about 150 kPa, more preferably equal to or greater than about 200 kPa, more preferably equal to or greater than about 250 kPa, and even more preferably equal to or greater than about 300 kPa. Preferably, the tensile strength of the foam according to the present invention is equal to or less than about 800 kPa, more preferably equal to or less than about 700 kPa, more preferably equal to or less than about 600 kPa, and even more preferably equal to or less than about 500 kPa. Tensile strength is conveniently measured according to ASTM D-3574.

In another embodiment, the present isocyanate-based polymer foam is a slab or slabstock polyurethane foam. Such a polyurethane foam is typically regarded as semi-rigid.

One means of measuring sound absorption performance of noise and vibration-absorbing applications, such as molded or slab polyurethane of the present invention, is by using equipment such as an impedance tube, or what is generally referred to as reverberation chambers, in accordance with individual OEM specifications. Another test used to evaluate sound absorption performance is air flow resistivity, according to ASTM C522-87. Preferably, for noise and vibration-absorbing applications, the air flow resistivity should be in the range of 30,000 to 200,000 rayls/m, more preferably 40,000 to 150,000 rayls/m. Rayls is pressure divided by volumetric flow rate and is equivalent to Pa/(m³/s) (or Pa-s/m³). Air flow resistivity is given in rayls/m which is pressure divided by the volumetric flow rate divided by the thickness of the foam specimen.

To manufacture the flame resistant polyurethane foam of the present invention as a molded foam, it is preferred to mix at least two streams to achieve the reaction mixture. The first stream comprises the isocyanate and the second stream (also known as the resin stream) comprises components (ii), (iii) and (iv) described above, together with any additional components described above, if present. Depending on the composition of the resin stream, elevated temperatures, above 40° C., may be required to mix the components. Preferably, the resin stream is mixed together at a temperature less than 40° C., more preferably it is mixed together at ambient temperature (defined herein as from 20° C. to 30° C.). The resin stream is then mixed with the first stream at the desired ratio, forming the reactive formulation which is dispensed in a closed mold system for the foaming reaction to occur. The first stream and the second stream may be mixed together by any known urethane foaming equipment—for the production of a molded foam, this is typically done using a so-called high pressure mixhead. The resulting reactive formulation is subjected to conditions sufficient to cure the reactive formulation to form a flame resistant flexible (molded) polyurethane foam which obtains a UL 94 V-0 rating at 0.25 inch after heat aging of the foam.

Slabstock polyurethane foam conventionally used in the production of automotive headliners or other non automotive applications is known as a foam (e.g., a resilient foam) having at least one uncontoured surface (i.e., the foam is a "free-rise" foam).

To manufacture the flame resistant polyurethane foam of the present invention as a slab or slabstock foam, it is preferred to mix the first stream and second (resin) stream described above (with the appropriate section ingredients and amounts for producing a slabstock foam). In a typical slab polyurethane foam production plant, the resultant foam is usually produced by dispensing a foamable composition into a trough having an open top (also known as a tunnel) and a conveyor bottom to move the composition away from the mixhead as the foam rises. Low pressure mixing is typically used and involves metering the components for foam production into a mixhead equipped with a stirrer (or other suitable agitation means) at a pressure generally less than 50 psi (usually 2-15 psi). The components are mixed in the mixhead and the foamable composition is expanded to produce polyurethane foam. As is known in the art, low pressure mixing is conventionally used to produce slabstock foam. It is known to vary the properties of the resulting foam by varying the nature and/or amount of one or more of the metered components.

Commercial slabstock polyurethane foam plants produce foam "buns" having dimensions such as up to 4 feet or more (height)×up to 6 feet (width) or more×up to 100 feet (length) or more. Each bun is then cut into parts of shape and dimension applicable to the intended use of the foam. For example, if the foam is used to produce an automotive headliner, a plurality of shorter length (e.g., 5 feet) buns are cut, depending on the specifications of the particular automotive headliner being produced. The shorter length bun is then sliced into sheets of appropriate thickness (e.g., ⅛ to ½ inches). Each sheet is then used as a component of sandwich headliner composite, which is trimmed and secured in the automobile. It is also known in the art to subject each sheet along with other components to further processing steps such as thermoforming so to confer to the planar sheet a slightly contoured appearance which more closely assumes the shape of the roof of the automobile. If the foam is being used as packaging material, sponge, mattress, cushions, underhood liner (vehicular), etc., it is cut into appropriate pieces for that application. Polyurethane foams can also be produced in discontinuous way known as box pour.

The preferred flame resistant polyurethane foam (molded or slab) thus manufactured can be suitably used for flame resistant and noise and vibration-absorbing applications according to the present invention, for example, the foams may be used for and/or molded into an article to be used for and/or molded/foamed in place as an engine cover, an underhood line, an engine noise insulator, a fuel injector encapsulant, a side cover, an oil pan cover, an under cover, a hood silencer and a dashboard silencer, which are disposed around or in the vicinity of an engine of an automotive vehicle, to reduce the amount of sound or noise to be transmitted from the engine. In particular, the flame resistant flexible polyurethane foam may be suitably used and/or molded into articles to be used for or molded/foamed in place as spacers or fillers for filling gaps or spaces between the engine and the surrounding devices, or encapsulation of engine parts for attenuating the standing waves.

Embodiments of the present invention will now be described with reference to the following Examples which should not be construed as limiting the scope of the invention. The term "pbw" used in the Examples refers to parts by weight.

In the Examples, the following materials were used:

Polyol #1, a polyether triol (MW=6,000 and OH #28-OH #35), commercially available from Bayer Corporation;

Polyol #2, a polymer polyol (MW=6,000 and OH #28), commercially available from Bayer Corporation;

Polyol #3, a PO-based polyether triol (MW=1,500), commercially available from Bayer Corporation;

Polyol #4, a 45% SAN secondary polyol (OH #28), commercially available from Bayer Corporation;

Polyol #5, aromatic polyester polyol (MW=450 and functionality 2), commercially available from Oxid;

Crosslinker #1, mixture of a polyether triol (OH #500=OH #700) and diol (OH #900-OH #1000), commercially available from Dow Chemical Company;

Crosslinker #2, a mixture (OH #440 and functionality 4.2-4.4) of a sucrose based polyol and a diol, commercially available from Huntsman Corporation;

OIP, carbon black dispersion in base polyol;

B4690, low-medium potency surfactant commercially available from Evonik;

Surfactant, a high molecular weight copolymer of an alkylated siloxane and a polyalkalene oxide;

Catalyst A, blowing catalyst commercially available from Momentive;

Catalyst B, gel catalyst commercially available from Air Products;

Catalyst C, a balanced catalyst, commercially available from Air Products;

Catalyst D, a tin catalyst, commercially available from Air Products;

water, indirect blowing agent;

Cell opener #1, high functionality EO rich cell opener commercially available from Dow Chemical Company;

EP, expandable graphite, solid particles commercially available from Nycaol;

RP, microencapsulated red phosphorus (43-48%) in a thixotropic blend with castor oil;

MDI #1, MDI isocyanate having 2.2-2.5 functionality with 27%-31% NCO content commercially available from Huntsman Corporation;

MDI #2, polymeric MDI, having 2.7-2.8 functionality with minimum 31% NCO content commercially available from Bayer Corporation; and TDI, 80/20 isocyanate commercially available from BASF.

Examples 1-8

In each of Examples 1-8, a molded foam was produced using the base formulation set out in Table 1. The foams included various amounts of expandable graphite and red phosphorus as set out in Table 2.

The following methodology was used to produce each foam.

The foam is made by mixing a reaction formulation comprising a polyol component and other additives set out in Table 1 (B side) and an isocyanate component (A side). The polyol component comprised polyols, catalyst, flame retardants, cross-linkers, surfactants, cell opener and black colorant wherein the components are mixed. The flame retardants components comprising the expandable graphite and red phosphorous are mixed last. The B side of the formulation was kept at ambient temperature (25° C.) and was mixed with an MDI isocyanate (A side) by high speed mixer at the ratio as in Table 2. The mixture was then poured into a heated aluminium mold (40° C.-70° C.) and cured for 3 minutes, after which the foam was removed from the mold, hand crushed and allowed to stand at room temperature for 24 hours.

The resulting foams were tested according to the Underwriters' Laboratories Standard 94 Flammability Test ("UL 94") and a modified form of UL 94 ("UL 94—Modified). UL 94—Modified involved heat aging separate samples of the foam according to each of the following protocols and testing the heat aged samples using the UL 94 protocol:

168 hours @ 150° C.; and 600 hours @ 120° C.

The results are provided in Table 3. In Table 3, a "PASS" reported for UL-Modified means that the both foam samples (i.e., not just one foam sample) heated aged pursuant to the above protocols passed the flammability test.

With reference to Table 3, it can be seen that the foam produced in accordance with Example 8 was the only foam that passed the combination of UL 94 and UL 94-modified for both 13 mm and 7 mm thick foam samples. In addition, a sample of the foam was aged for 3000 hours at 100° C. —this heat aged foam sample was also tested and passed the Underwriters' Laboratories Standard 94 Flammability Test.

Examples 9-16

In each of Examples 9-16, a slab foam was produced using the base formulation set out in Table 4. The foams included various amounts of expandable graphite and red phosphorus as set out in Table 5.

The following methodology was used to produce each foam.

A resin mixture was produced by mixing all ingredients except the isocyanate in a 1 L mixing vessel for a period of approximately 10 seconds at 3000 rpm. Next, the isocyanate was added to the mixing vessel and the contexts were mixed for a further 15 seconds. The contents of the mixing vessel were transferred to an open box (15"×12"×12") and allowed to free rise. The resulting foam was allowed to cure for at least 24 hours prior to testing.

The resulting foams were tested according to the Underwriters' Laboratories Standard 94 Flammability Test ("UL 94") and a modified form of UL 94 ("UL 94-Modified) as described above for Examples 1-8. The results are provided in Table 6.

With reference to Table 3, it can be seen that the foam produced in accordance with Examples 14-16 were the only foams that passed the combination of UL 94 and UL 94-modified for both 13 mm and 10 mm thick foam samples.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

TABLE 1

| Ingredient | Amount (pbw) |
| --- | --- |
| Polyol #1 | 57.5 |
| Cross-linker #1 | 6.5 |
| Polyol #2 | 30 |
| OIP | 10 |
| B4690 | 0.5 |
| Catalyst A | 0.1 |
| Catalyst B | 0.45 |
| Water | 1.55 |
| Cell opener #1 | 2 |
| MDI #1 | 53.67 |

TABLE 2

| Example | EG (pbw) | RP (pbw) |
| --- | --- | --- |
| 1 | 10 | 0 |
| 2 | 20 | 0 |
| 3 | 30 | 0 |
| 4 | 0 | 20 |
| 5 | 5 | 20 |
| 6 | 10 | 20 |
| 7 | 20 | 10 |
| 8 | 20 | 15 |

TABLE 3

| | Underwriters' Laboratories Standard 94 Flammability Test | | | |
| --- | --- | --- | --- | --- |
| Example | 13 mm/ UL 94 | 13 mm/UL 94 - Modified | 7 mm/ UL 94 | 7 mm/UL 94 - Modifed |
| 1 | FAIL | not tested | FAIL | not tested |
| 2 | PASS | not tested | FAIL | not tested |
| 3 | PASS | not tested | FAIL | not tested |
| 4 | FAIL | not tested | not tested | not tested |
| 5 | FAIL | not tested | not tested | not tested |
| 6 | PASS | not tested | PASS | not tested |
| 7 | PASS | not tested | PASS | FAIL |
| 8 | PASS | PASS | PASS | PASS |

TABLE 4

| Ingredient | Amount (pbw) |
| --- | --- |
| Polyol #3 | 23 |
| Crosslinker #2 | 7 |
| Polyol #5 | 27 |
| Polyol #4 | 33 |
| Catalyst D | 0.05 |
| Catalyst C | 0.6 |
| Surfactant | 3 |
| OIP | 10 |
| Water | 8.5 |
| MDI #2 | 84 |
| TDI | 21 |

TABLE 5

| Example | EG (pbw) | RP (pbw) |
| --- | --- | --- |
| 9 | 20 | 0 |
| 10 | 15 | 25 |
| 11 | 20 | 10 |
| 12 | 20 | 12 |
| 13 | 20 | 15 |
| 14 | 20 | 20 |
| 15 | 25 | 15 |
| 16 | 25 | 20 |

TABLE 6

| | Underwriters' Laboratories Standard 94 Flammability Test | | | |
| --- | --- | --- | --- | --- |
| Example | 13 mm/ UL 94 | 13 mm/UL 94 - Modified | 10 mm/ UL 94 | 10 mm/UL 94 - Modifed |
| 9 | FAIL | not tested | not tested | not tested |
| 10 | not tested | not tested | PASS | not tested |
| 11 | FAIL | not tested | FAIL | not tested |
| 12 | FAIL | not tested | not tested | not tested |
| 13 | FAIL | not tested | not tested | not tested |
| 14 | PASS | PASS | PASS | PASS |
| 15 | PASS | PASS | PASS | PASS |
| 16 | PASS | PASS | PASS | PASS |

What is claimed is:

1. A polyurethane foam produced from a reaction mixture comprising:
   (i) at least one isocyanate;
   (ii) a mixture of polyols comprising: (a) an aromatic polyester polyol, and (b) at least one additional polyol other than the aromatic polyester polyol;
   (iii) red phosphorus in an amount in the range of from about 18 to about 25 parts by weight per 100 parts by weight of component (ii);
   (iv) expandable graphite in an amount in the range of from about 15 to about 20 parts by weight per 100 parts by weight of component (ii); and
   (v) a blowing agent consisting essentially of water.

2. The polyurethane foam defined in claim 1 that has a V-0 rating according to Underwriters' Laboratories Standard 94 Flammability Test after aging of separate samples of the foam (i) for 168 hours at 150° C., and (ii) for 600 hours at 120° C.

3. The polyurethane foam defined in claim 1 that has a V-0 rating at 7 mm foam thickness according to Underwriters' Laboratories Standard 94 Flammability Test after aging of separate samples of the foam (i) for 168 hours at 150° C., and (ii) for 600 hours at 120° C.

4. The polyurethane foam defined in claim 1 that has a V-0 rating at 10 mm foam thickness according to Underwriters' Laboratories Standard 94 Flammability Test after aging of separate samples of the foam (i) for 168 hours at 150° C., and (ii) for 600 hours at 120° C.

5. The polyurethane foam defined in claim 1 that has a V-0 rating at 13 mm foam thickness according to Underwriters' Laboratories Standard 94 Flammability Test after aging of separate samples of the foam (i) for 168 hours at 150° C., and (ii) for 600 hours at 120° C.

6. The polyurethane foam defined in claim 1, wherein the foam has a density of less than 1.5 pcf.

7. The polyurethane foam defined in claim 3, wherein the foam has a density of less than 1.5 pcf.

8. The polyurethane foam defined in claim 4, wherein the foam has a density of less than 1.5 pcf.

9. The polyurethane foam defined in claim 5, wherein the foam has a density of less than 1.5 pcf.

10. The polyurethane foam defined in claim 1, wherein the reaction mixture comprises the red phosphorus in an amount in the range of from about 18 parts to about 22 parts by weight per 100 parts by weight of component (ii).

11. The polyurethane foam defined in claim 3, wherein the reaction mixture comprises the red phosphorus in an amount in the range of from about 18 parts to about 22 parts by weight per 100 parts by weight of component (ii).

12. The polyurethane foam defined in claim 4, wherein the reaction mixture comprises the red phosphorus in an amount in the range of from about 18 parts to about 22 parts by weight per 100 parts by weight of component (ii).

13. The polyurethane foam defined in claim 5, wherein the reaction mixture comprises the red phosphorus in an amount in the range of from about 18 parts to about 22 parts by weight per 100 parts by weight of component (ii).

14. The polyurethane foam defined in claim 1, wherein the reaction mixture comprises expandable graphite in an amount in the range of from about 17 parts to about 20 parts by weight per 100 parts by weight of component (ii).

15. The polyurethane foam defined in claim 3, wherein the reaction mixture comprises expandable graphite in an amount in the range of from about 17 parts to about 20 parts by weight per 100 parts by weight of component (ii).

16. The polyurethane foam defined in claim 4, wherein the reaction mixture comprises expandable graphite in an amount in the range of from about 17 parts to about 20 parts by weight per 100 parts by weight of component (ii).

17. The polyurethane foam defined in claim 5, wherein the reaction mixture comprises expandable graphite in an amount in the range of from about 17 parts to about 20 parts by weight per 100 parts by weight of component (ii).

18. The polyurethane foam defined in claim 1, wherein component (ii) (b) is selected from the group consisting of hydroxyl-terminated polyhydrocarbons, hydroxyl-terminated polyformals, fatty acid triglycerides, hydroxyl-terminated polyesters, hydroxymethyl-terminated polyesters, hydroxymethyl-terminated perfluoromethylenes, polyalkyleneether glycols, polyalkylenearyleneether glycols, polyalkyleneether triols and mixtures thereof.

19. The polyurethane foam defined in claim 1, wherein component (ii) (b) is selected from the group consisting of adipic acid-ethylene glycol polyester, poly(butylene glycol), poly(propylene glycol), hydroxyl-terminated polybutadiene and mixtures thereof.

20. The polyurethane foam defined in claim 1, wherein component (ii) (b) is a polyether polyol.

21. The polyurethane foam defined in claim 20, wherein the polyether polyol a molecular weight in the range of from 200 to about 10,000.

22. The polyurethane foam defined in claim 20, wherein the polyether polyol a molecular weight in the range of from 2,000 to about 8,000.

23. The polyurethane foam defined in claim 20, wherein the polyether polyol a molecular weight in the range of from 4,000 to about 7,000.

24. The polyurethane foam defined in claim 1, wherein component (ii) is substantially completely free of a polymer polyol.

25. The polyurethane foam defined in claim 1, wherein component (ii) (b) is a bio-based polyol.

26. The polyurethane foam defined in claim 1, in the form of a molded foam.

27. The polyurethane foam defined in claim 26, wherein the molded foam has a density in the range of 4 to 10 pounds/cubic foot when measured pursuant to ASTM D-3574.

28. The polyurethane foam defined in claim 26, wherein the molded foam has a density in the range of 5 to 8.8 pounds/cubic foot when measured pursuant to ASTM D-3574.

29. The polyurethane foam defined in claim 1, in the form of a slabstock foam.

30. The polyurethane foam defined in claim 29, wherein the slabstock foam has a density in the range of 1 to 4 pounds/cubic foot when measured pursuant to ASTM D-3574.

31. The polyurethane foam defined in claim 29, wherein the slabstock foam has a density in the range of 1 to 2.5 pounds/cubic foot when measured pursuant to ASTM D-3574.

32. The polyurethane foam defined in claim 1, wherein the foam has an air flow resistivity when measured pursuant to ASTM C522-87 in the range of 30,000 to 200,000 rayls/m.

33. The polyurethane foam defined in claim 1, wherein the foam has an air flow resistivity when measured pursuant to ASTM C522-87 in the range of 40,000 to 150,000 rayls/m.

34. A polyurethane foam produced from a reaction mixture comprising:
 (i) at least one isocyanate;
 (ii) a mixture of polyols comprising: (a) an aromatic polyester polyol, and (b) at least one additional polyol, wherein the additional polyol comprises a polyether polyol;
 iii) a flame retardant component consisting essentially of a combination of (a) red phosphorus in an amount in the range of from about 18 to about 25 parts by weight per 100 parts by weight of component (ii), and (b) expandable graphite in an amount in the range of from about 15 to about 20 parts by weight per 100 parts by weight of component (ii); and
 (iv) a blowing agent consisting essentially of water.

35. The polyurethane foam defined in claim 1, wherein said at least one additional polyol comprises a polyether triol.

* * * * *